July 6, 1948.  L. L. SMITH  2,444,682
OVERFLOW CONTROL FOR FILTER BEDS
Filed March 30, 1945  2 Sheets-Sheet 1
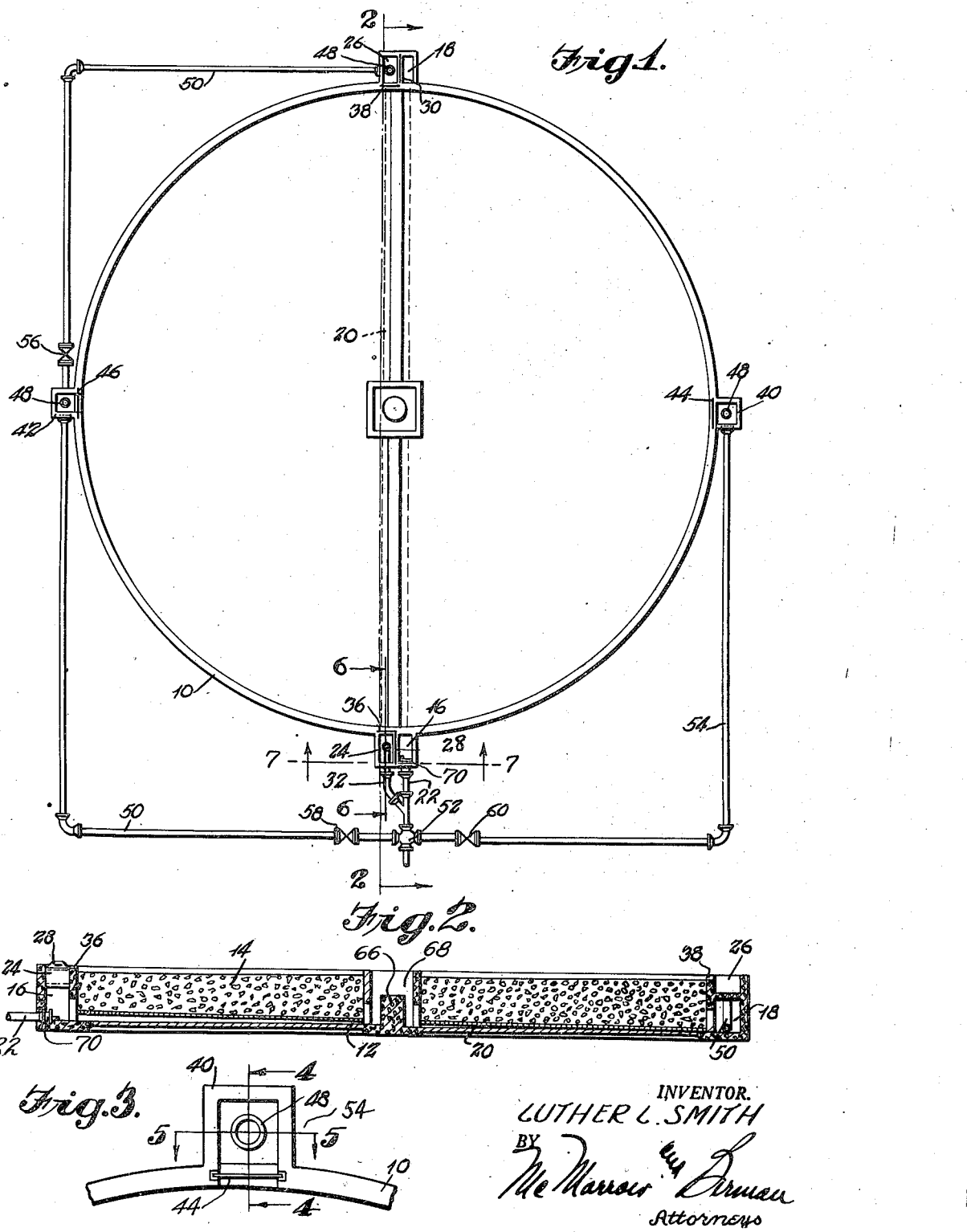
INVENTOR.
LUTHER L. SMITH
BY
Attorneys July 6, 1948.  L. L. SMITH  2,444,682
OVERFLOW CONTROL FOR FILTER BEDS
Filed March 30, 1945  2 Sheets-Sheet 2

INVENTOR.
LUTHER L. SMITH
BY
Attorneys

Patented July 6, 1948

2,444,682

UNITED STATES PATENT OFFICE 2,444,682

OVERFLOW CONTROL FOR FILTER BEDS

Luther L. Smith, Warner Robins, Ga.

Application March 30, 1945, Serial No. 585,593

3 Claims. (Cl. 210—7)

This invention appertains to overflow controls for filter beds of sewage treatment plants, and has for one of its several objects to provide a system of such control for use in flooding off the larvae of filter flies from a filter bed.

In accomplishing the objects and purposes of the invention, the controls are equidistantly spaced about the filter bed so that the larvae, deposited by filter flies in the rock forming the filter bed, can be readily flooded from the bed in accordance with changes in direction of winds blowing across the surface of the bed; it having been ascertained that, when a water level is established above the bed surface, the larvae loosens from the bed rock and rises to the surface of the water and, when floating thereon, collects at the side of the filter bed, in the direction of blow of the wind.

With the foregoing and other objects and advantages in view, the invention resides in the certain new and useful combination, construction, and arrangement of parts, as will be hereinafter more fully described, set forth in the appended claims, and illustrated in the accompanying drawings, in which:

Figure 1 is a top plan view of a trickling filter bed, showing the system of overflow controls therefor, in accordance with the invention;

Figure 2 is a vertical section, taken through the line 2—2 on Figure 1, looking in the direction of the arrows;

Figure 3 is an enlarged, fragmentary, top plan view of one of the overflow wells and the weir gate control therefor;

Figure 4:
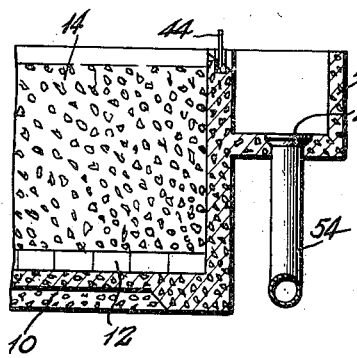
Figure 4 is an enlarged, fragmentary, vertical section, taken through the line 4—4 on Figure 3, looking in the direction of the arrows.
Figure 5:
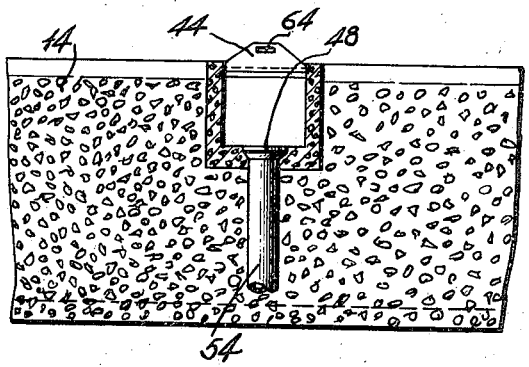
Figure 5 is a sectional view similar to that of Figure 4, but taken through the line 5—5 on Figure 3, looking in the direction of the arrows.
Figure 6:
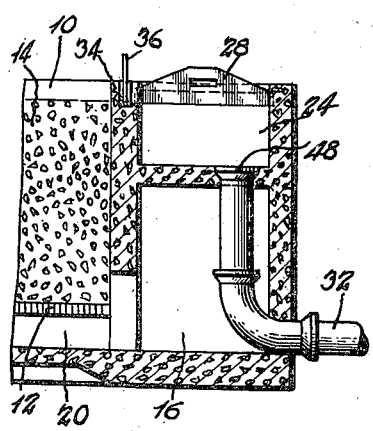
Figure 6 is another enlarged, fragmentary, vertical section, taken through the line 6—6 on Figure 1, looking in the direction of the arrows.
Figure 7:
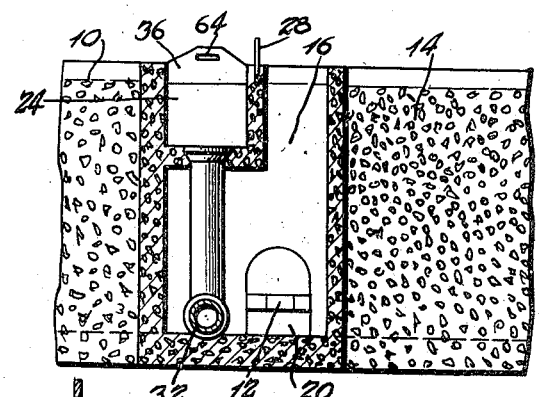
Figure 8:
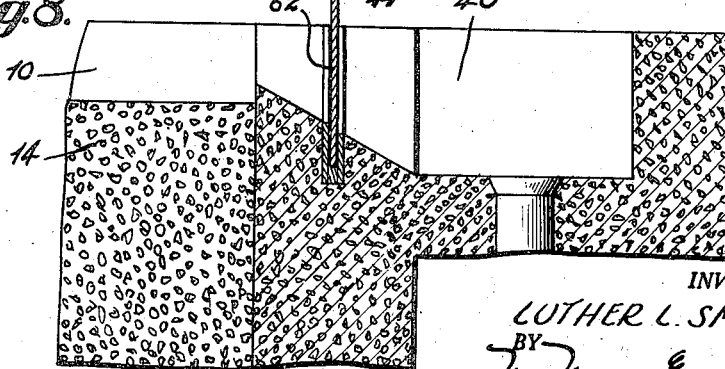

Figure 7 is a sectional view similar to that of Figure 6, but taken through the line 7—7 on Figure 1, looking in the direction of the arrows; and Figure 8 is an enlarged fragment of the vertical section of Figure 4 taken on the same line as that of Figure 4, showing the spillway through the side wall of the filter bed tank and the weir gate therefor, the spillway leading from the surface of the filter bed and sloping downwardly therefrom into an overflow well illustrating a modification, wherein the lower surface of the well is at a higher elevation than that of the well shown in Fig. 4.

Referring in detail to the drawings, wherein like characters of reference denote corresponding parts in the several views, the invention, as it is exemplified therein, is applied to a more or less conventional type of trickling filter bed for the treatment of sewage, which is made up of a cylindrical, open top basin or tank 10, of concrete, having its bottom lined with a layer of filter blocks 12, supporting a bed of crushed rock 14, filling the tank to a level short of the top edge of its side wall. Two wells 16 and 18 are formed exteriorly of the side wall of the tank 10, one diametrically opposite the other, and are connected at their bottoms by a cross drainage channel 20, formed in the bottom wall of the tank, below the level of the layer of filter blocks 12, substantially as shown in Figures 1 and 2. A pipe line 22 leads from the well 16, at the front side of the tank 10, to convey the filtered liquid to a point for further treatment, such as the final clarification thereof.

In carrying out the invention, the two main wells 16 and 18 are modified, respectively, by the formation of auxiliary overflow wells or catch basins 24 and 26 within the upper open end portions thereof, each of which has a horizontal area substantially one-half of that of a main well, with its bottom located in a horizontal plane a short distance below the level of the rock bed 12. The inner vertical side walls of the overflow wells 24 and 26, forming the divisions between the same and the main wells 16 and 18, have their top edges located below those of the outer side walls and sloped to provide spillways, for the overflow of liquid from the main wells; the spillways having weir gates 28 and 30 to control the overflow of liquid into the auxiliary wells 24 and 26, respectively. Opening through the bottom of the auxiliary overflow well 24 is a drainage pipe 32, leading to and connecting the pipe line 22. Formed in the top edge of the side wall of the tank 10 are spillways 34, which slope downwardly into the auxiliary overflow wells 24 and 26, from the level of the rock bed 12, and are provided with weir gates 36 and 38, respectively.

Formed on the outer side of the side wall of the tank 10 are other overflow wells 40 and 42, which are disposed at opposite sides of the tank and spaced equidistantly from the auxiliary overflow wells 24 and 26, and have spillways opening into the same through the side wall of the tank, with weir gates 44 and 46, respectively, to control the flow of liquid from the tank, above the level of the rock bed 12. A drainage outlet 48 is formed in the bottom of each of the overflow wells 26, 40, and 42, and those of the overflow wells 26 and 42 are connected with a common pipe line 50 leading to and connecting the pipe line 22, as at 52, outwardly from the point of connection of the drainage outlet pipe 32 therewith, while the outlet from the overflow well 40 has connection with a pipe line 54, leading to and connecting the pipe line 22, commonly with the pipe line 50. A cutoff valve 56 is interposed in the pipe line 50, between the outlets from the overflow wells 26 and 42; a second cutoff valve 58 in the same pipe line, between the outlet from the overflow well 42 and the connection 52; and a third cutoff valve 60 in the pipe line 54, between the outlet from the overflow well 40 and the connection 52. As best shown in Figure 8, each of the weir gates is mounted for vertical sliding movements in metal channels 62 secured in the sides of the spillway openings, in the side wall of the tank 10, and are provided with hand grip openings 64 in portions of the same projecting above the top of the tank wall.

In operation, with the shear-gate 70 at the outlet end of the drainage pipe line 22 within the main well 16 open, and the several cutoff valves 56, 58, and 60, together with the weir gates 28, 30, 36, 38, 44, and 46, closed, the sewage treating plant will operate in the usual manner, briefly as follows: Sewage from a primary clarifier (not shown) passes to and through a dosing tank (not shown) to a spray head (not shown). This spray head is mounted to rotate on a pedestal 66, rising from the bottom of a well 68, formed centrally within the tank 10, and has a plurality of radially extending, hollow, perforated arms, to distribute the partially clarified liquid evenly over the surface of the rock bed 14; the liquid trickling downwardly through the latter and onto the filter blocks 12, from whence it passes to the drain channel 20 and outwardly from the main well 16, through the pipe line 22 to a secondary, or final, clarifier (not shown).

In warm weather, particularly in the summertime, "filter flies" deposit their larvae within the crevices of the rock bed 14 and, unless destroyed, will rapidly develope to reproduce their kind. In order to rid the rock bed 14 of the larvae, the shear gate 70 is closed and the liquid is allowed to fill the tank 10, to a level above the surface of the rock bed. With the rise of the liquid within the tank to such level, the larvae loosens from the crevices in the rock bed 14 and floats on the surface of the liquid, and will accumulate at a side of the tank, in the direction of the blowing of the wind. After an elapse in time sufficient to assure of the flotation of the larvae on the surface of the liquid, the weir gate of an overflow well, at the lee side of the tank 10, will be opened for the draining off of the surplus liquid and its larvae content, through an outlet 48 and the drain pipe line connected therewith, upon the opening of one or more of the cutoff valves 56, 58, and 60.

Without further description, it is thought to be obvious that the invention provides a simple but highly effective means for obliterating an otherwise serious menace to the health of a community where open filter beds are employed in the treatment of sewage; and it should be understood that, while I have described and illustrated my invention in specific terms and in detail, changes in design and minor details of construction may be resorted to, within the limits defined by the scope of the appended claims.

What I claim is:

1. In a trickling filter basin having a relatively large open shallow area adapted to hold a filter aggregate with the upper surface of the aggregate spaced from the upper edge of the basin, and having a false bottom with a centrally disposed drainage channel thereunder, the combination, which comprises wells disposed at opposite ends of said drainage channel positioned beyond the boundary of the basin, a plurality of weirs positioned around said basin communicating with the interior thereof, the throats of said weirs positioned above the upper surface of the aggregate and below the upper edge of the basin, gates in said weirs, catch basins communicating with said weirs, a shear gate in the well at the lower end of said drainage channel, a discharge connection leading from the shear gate, and overflow connections from the catch basins to said discharge connection.

2. In a trickling filter basin having a relatively large open shallow area adapted to hold a filter aggregate with the upper surface of the aggregate spaced from the upper edge of the basin, and having a false bottom with a centrally disposed drainage channel thereunder, the combination, which comprises wells disposed at opposite ends of said drainage channel positioned beyond the boundary of the basin, a plurality of weirs positioned around said basin communicating with the interior thereof, the throats of said weirs positioned above the upper surface of the aggregate and below the upper edge of the basin, gates in said weirs, catch basins communicating with said weirs, a shear gate in the well at the lower end of said drainage channel, a discharge connection leading from the shear gate, overflow connections from the catch basins to said discharge connection, and valves in said overflow connections.

3. In a trickling filter basin having a relatively large open shallow area adapted to hold a filter aggregate with the upper surface of the aggregate spaced from the upper edge of the basin and having a bottom formed of filter bricks with a centrally disposed drainage channel thereunder, the combination which comprises vertically disposed wells at opposite ends of said drainage channel positioned beyond the periphery of the basin, a plurality of weirs positioned around said basin communicating with the interior thereof, overflow weirs in the sides of the wells, the throats of said weirs positioned above the upper surface of the aggregate and below the upper edge of the basin, gates in said weirs, catch basins communicating with said weirs, a shear gate in the well at the lower end of said drainage channel, a discharge connection leading from the shear gate, overflow connections from the catch basins to the said discharge connections, and valves in said overflow connections.

LUTHER L. SMITH.

REFERENCES CITED

The following references are of record in the file of this patent:

UNITED STATES PATENTS

| Number | Name | Date |
|---|---|---|
| 168,191 | Slaney | Sept. 28, 1875 |
| 798,473 | Wilson | Aug. 29, 1905 |
| 813,984 | Macnaughton | Feb. 27, 1906 |
| 944,528 | Von Wessely | Dec. 28, 1909 |
| 1,672,583 | Travers | June 5, 1928 |
| 1,802,726 | Levine | Apr. 28, 1931 |
| 2,073,441 | Blunk | Mar. 9, 1937 |
| 2,097,111 | Walker | Oct. 26, 1937 |
| 2,233,981 | Jewell | Mar. 4, 1941 |
| 2,287,856 | Beekhuis, Jr., et al. | June 30, 1942 |
| 2,301,025 | Friend et al. | Nov. 3, 1942 |
| 2,317,782 | Levine | Apr. 27, 1943 |

OTHER REFERENCES

American Sewerage Practice, vol. III, Leonard Metcalf and Harrison P. Eddy, 3rd edition, published in 1935, McGraw-Hill Book Co., Inc., N. Y. and London. (A copy available in Div. 49.) Pp. 485 and 486 are cited.